July 25, 1967     R. H. PARK     3,332,112
APPARATUS FOR EXTRUDING HOLLOW PLASTIC ARTICLES
Original Filed Feb. 25, 1963     5 Sheets-Sheet 1
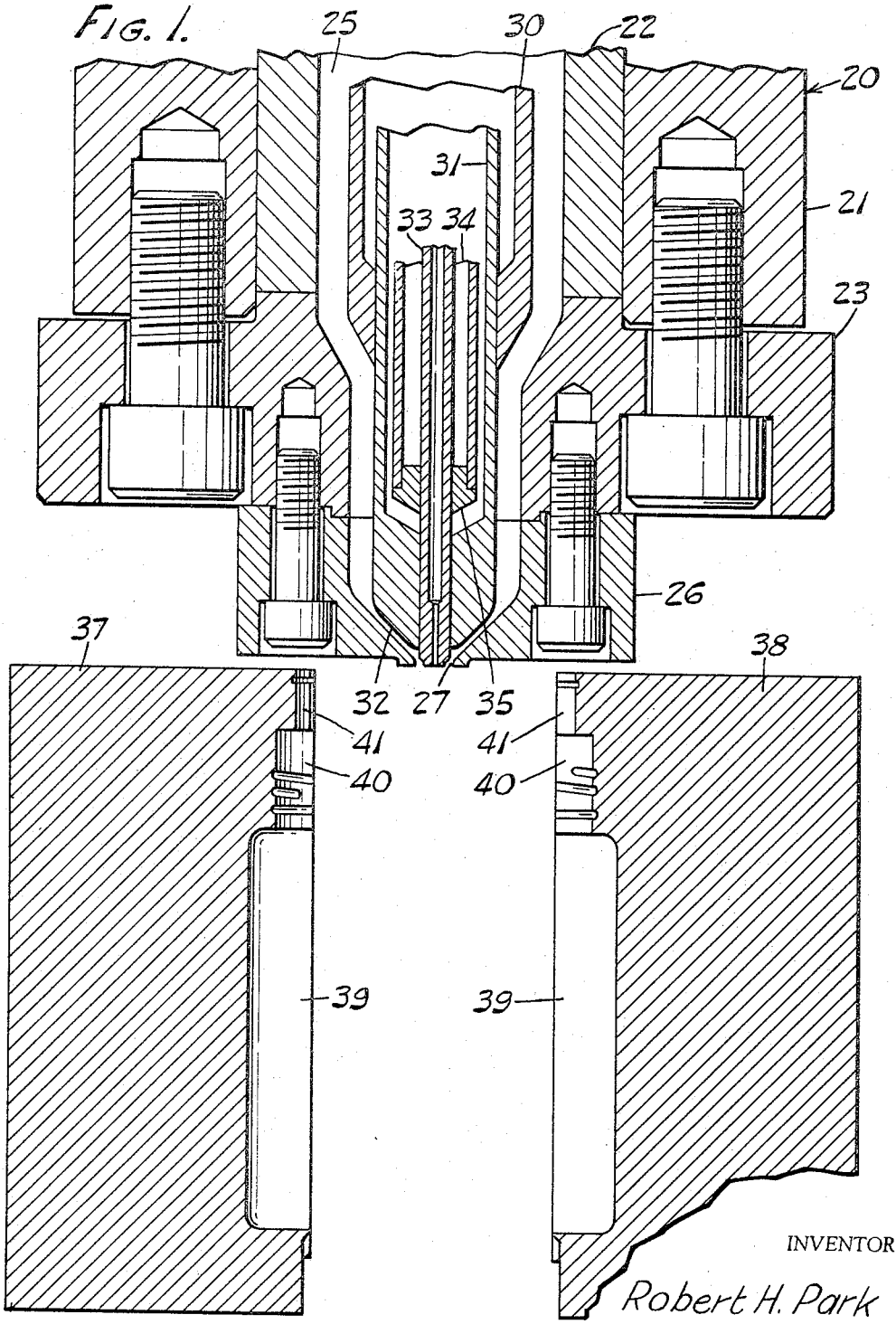
INVENTOR
Robert H. Park
BY
Christel & Bean
ATTORNEYS

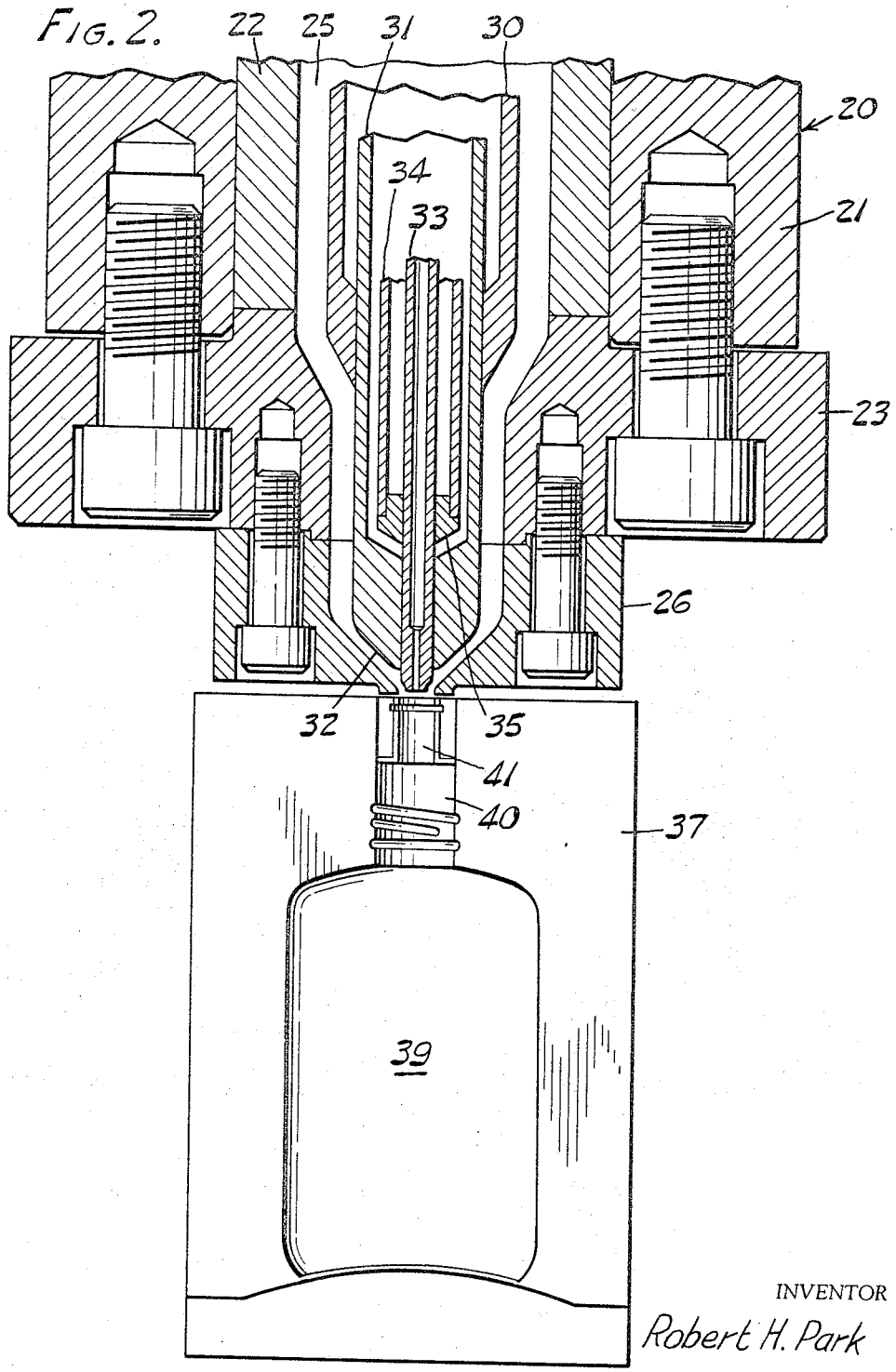

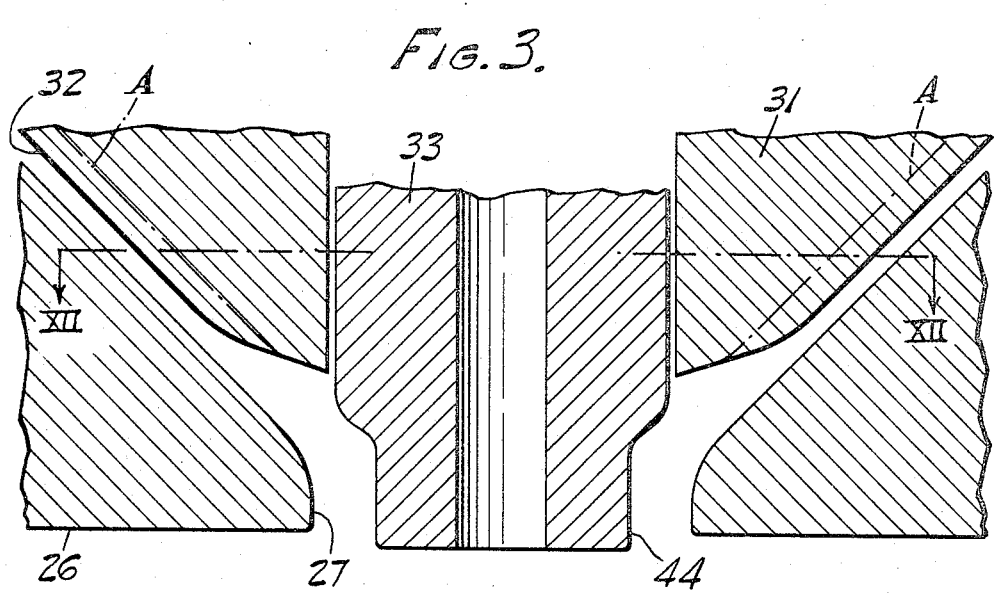
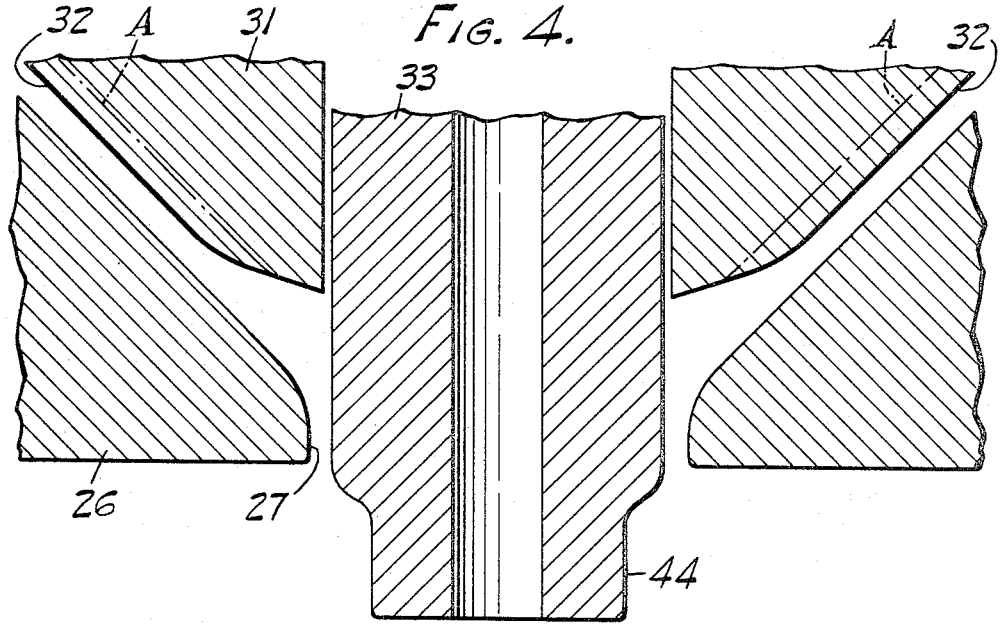

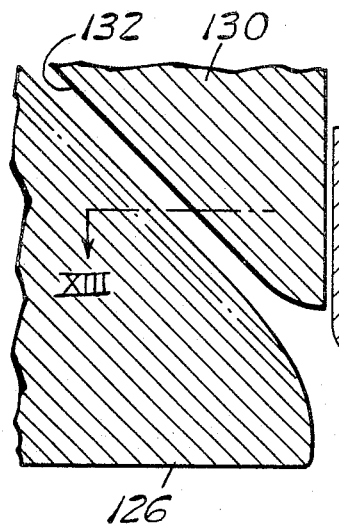
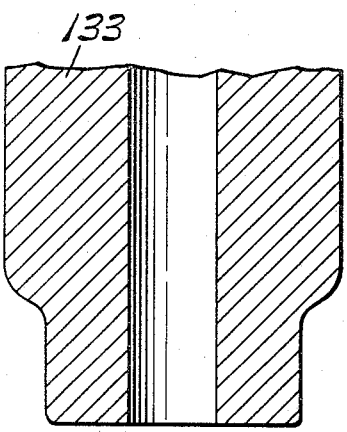
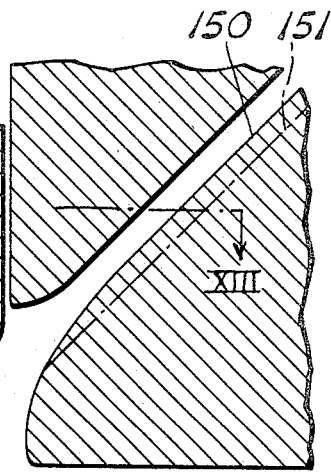
FIG. 5.
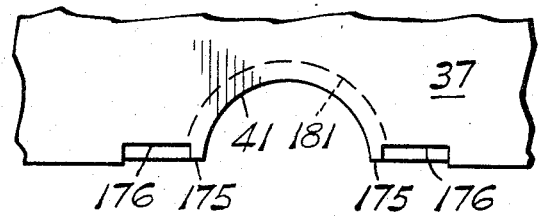
FIG. 7.
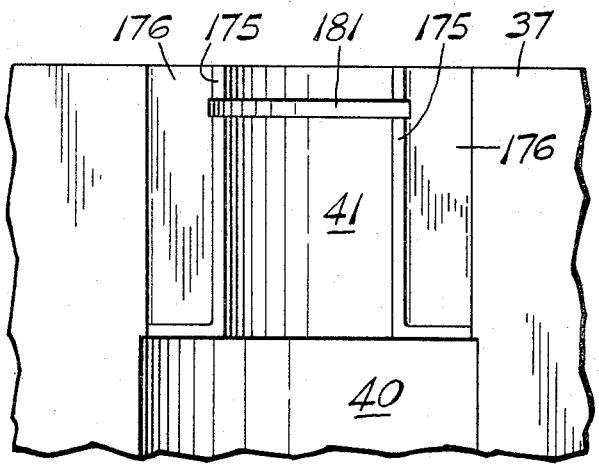
FIG. 6.
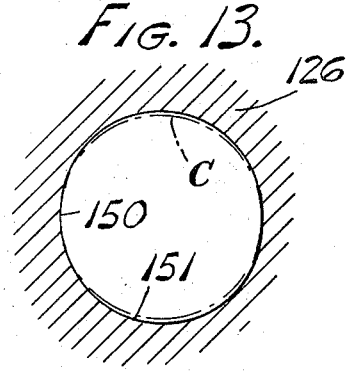
FIG. 13.
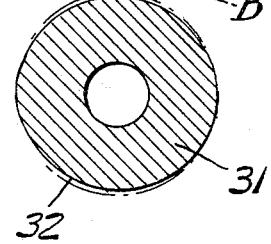
FIG. 12.
INVENTOR
ROBERT H. PARK
BY
Christel & Bean
ATTORNEYS INVENTOR
Robert H. Park
BY Christel & Bean
ATTORNEYS United States Patent Office 3,332,112
Patented July 25, 1967

3,332,112
APPARATUS FOR EXTRUDING HOLLOW
PLASTIC ARTICLES
Robert H. Park, Dennis, Mass., assignor to Brockway
Glass Company, Inc., Brockway, Pa.
Continuation of application Ser. No. 260,715, Feb. 25,
1963. This application July 6, 1965, Ser. No. 473,892
The portion of the term of the patent subsequent to
Feb. 26, 1980, has been disclaimed
7 Claims. (Cl. 18—14)

This invention relates to an apparatus for producing hollow plastic articles, such as containers, by extruding a tubular blank and subsequently blowing the same outwardly into conformity with a mold. This application is a continuation of my copending application, Ser. No. 260,715 filed Feb. 25, 1963, and now abandoned, which in turn is a continuation-in-part of my patent application, Ser. No. 775,055, filed Nov. 19, 1958, now Patent No. 3,078,507, dated Feb. 26, 1963.

According to the apparatus of the aforesaid patent a tubular blank or parison is extruded through an extrusion orifice, which is a figure of revolution, and which converges round the axis of extrusion, and about an extrusion mandrel comprising a plurality of concentric tubular elements having generally tapering ends, which elements are adapted to be moved independently and cyclically during and subsequent to the extrusion process.

In producing blown plastic containers, for instance, wherein the body is flat or oval, it is desirable in order to form a body having uniform wall thickness after blowing, to extrude a tube wherein the wall is thicker at some points than at others.

In the aforesaid patent means are provided for cyclically moving the concentric tubular members axially to vary the physical characteristics of the extruded tube along its length. More particularly, means are provided for producing tubular extrusions wherein selected portions along the length of the extrusion have non-uniform wall thicknesses, considered circumferentially. In the aforesaid patent this variable extrusion is accomplished by employing plural axially movable sleeve members having tapered ends and with the tapered end of at least one of said sleeves of non-circular form.

In one form of the apparatus of the present invention an equivalent result is attained by employing internal cyclically movable extrusion members which are figures of revolution and an external extrusion member having portions thereof adjacent at least one sleeve end which are non-circular whereby a portion of at least one of the cyclically variable extrusion passages employed in extruding a portion of the tubular parison is of varying thickness around the circumference.

By thus scalloping the orifice or the external extrusion surface adjacent to the orifice the cost of manufacturing specially shaped parts is reduced, particularly when adapted to the production of specific blown objects. Furthermore, removal and replacement of the cap member is all that is required to vary the range of the dimensional characteristics of the extruded tube.

This ready removal and replacement of the cap member is particularly advantageous since the degree of scalloping or non-circularity of the extrusion surfaces must be determined empirically, in fact by cut and try methods, in producing a tubular parison to suit a particular blown body shape. To some extent also the extrusion wall thicknesses, or rather the variations therein, are governed by the kind of plastic employed.

In addition to the above, the present invention also provides novel means for facilitating the formation of a satisfactory terminal neck portion of an extruded and blown plastic article. The problems incident to this objective are particularly present when the blown article is provided with a false finish, that is, an additional reduced outer neck portion which is removed in trimming the neck portion proper from the ultimate blown article.

In the apparatus of the aforesaid patent a degating sleeve is illustrated which in addition to severing the extrusion from the parent body of plastic material can be used to compress the material in the neck portion of the mold. When such a degating sleeve is not being employed to produce such compression or is not present in the apparatus, for instance, the problem of insuring a fully molded false finish is aggravated.

In the present apparatus, by way of example, the false finish is molded between external molding surfaces of the separable mold parts and an internal mandrel, which may comprise a blow tube as in the present apparatus. If the extruded material surrounding the blow tube is insufficient the false finish may be blown out against the mold surfaces leaving an air space around the blow tube. In this event, air will tend to leak between the plastic and the blow tube thereby causing loss of air and geneailly undesirable extrusion conditions because of the cooling effect of the escaping air on the orifice.

If the wall thickness of the extrusion surrounding the blow tube is excessive fins are formed which prevent proper closing of the mold parts, causing a very objectionable flash or seam line around the molded article due to incomplete closure of the mold parts. In some cases the fins thus formed may project from the false finish to a degree which impedes handling of the article in equipment for subsequent trimming operations and the like.

In the present apparatus this problem is avoided by providing narrow relief areas adjacent to the false finish portion of the mold on at least one of the mold parts so that excess plastic material, upon closure of the mold parts, can flow into the relief area and form fins of controlled thickness which are narrow enough not to impede trimming operations and which have no tendency to prevent proper closure of the mold parts.

In this way a substantial tolerance in the wall thickness of the extrusion or that part of the extrusion which forms the false finish is permitted. The wall thickness of the extrusion will be at least as thick as the annular space between the false finish mold and the blow tube and may be of greater thickness up to the capacity of the aforesaid recesses for receiving excess plastic material.

While certain representative embodiments of the principles of the present invention are illustrated in the drawings and described in the following specification, it is to be understood that such embodiments are by way of example only and that the scope of the present invention is not limited otherwise than as defined in the appended claims.

In the drawings:

FIG. 1 is a general elevational view of one form of the extrusion and blow molding apparatus of the present invention;

FIG. 2 is a view similar to FIG. 1 but taken at right angles thereto;

FIG. 3 is a substantially enlarged cross-sectional view taken similarly to FIG. 1 showing the extrusion passage portion of the apparatus;

FIG. 4 is a view similar to FIG. 3 with the parts in position for final extrusion;

FIG. 5 is a view similar to FIG. 3 but showing an embodiment wherein the scalloping is located on the orifice instead of on the internal control sleeve;

FIG. 6 is a fragmentary elevational view taken similarly to FIG. 2 but on a considerably enlarged scale showing the neck and false finish portion of one of the mold parts;

FIG. 7 is a plan view of the structure of FIG. 6;

FIG. 12 is a fragmentary cross-sectional view taken approximately on the line XII—XII of FIG. 3 but on a scale reduced somewhat from FIG. 3; and FIG. 13 is a fragmentary cross-sectional view taken approximately on the line XIII—XIII of FIG. 5 but on a scale reduced somewhat from FIG. 5.

Figure 8:
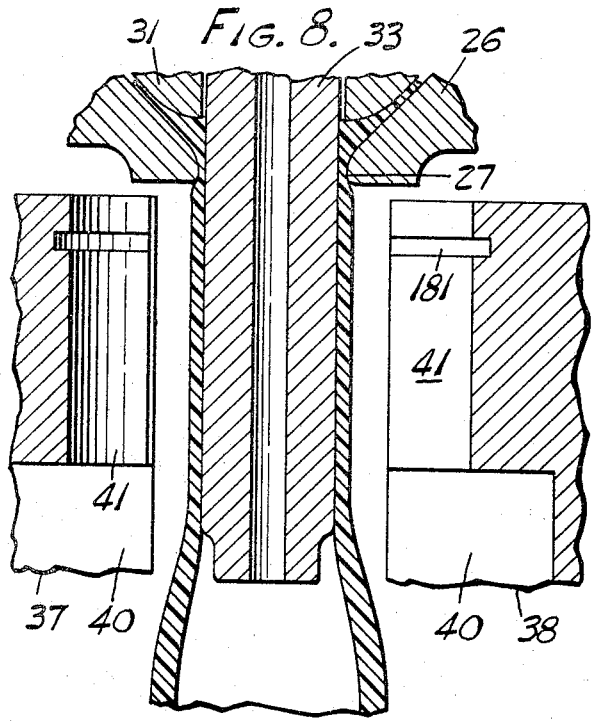
FIG. 8 is a fragmentary cross-sectional view illustrating conditions just prior to the closing of the mold with the blow tube in its fully depressed position.

Like characters of reference denote like parts throughout the several figures of the drawings. The present invention is concerned primarily with the extrusion head and with the construction and operation of the extruding members thereof and also with the neck cavity portion of the mold means. Accordingly only so much of the surrounding apparatus is illustrated as is proper for a full understanding of the present invention.

The several tubular members illustrated in the drawings and described in the following specification have certain relative vertical movements in timed relation with respect to each other and such movements are described without reference to the means for producing the relative movements. It will be understood by those skilled in this art that cam controlled rock arms, fluid pressure cylinders, or other known means may be employed for producing the required timed axial movements.

Referring particularly to FIGS. 1 and 2, the numeral 20 designates generally an extrusion head proper which comprises a shell or body member 21 having a sleeve 22 fixed therein and an end member 23 fixed to the outer end of shell or body member 21. The removability of sleeve 22 and end member 23 from body member 21 facilitates manufacture and the substitution of sleeves and end members of various internal diameters and configurations for various jobs, and also facilitates cleaning the plastic flow passages as the necessity arises.

Sleeve member 22 and end member 23 are bored, as shown in FIGS. 1 and 2, to form the external confines of an annular extrusion chamber 25, the bore in the end member 23 being partially tapered as shown, whereby the extrusion chamber reduces in diameter progressively toward its lower end. The lowermost portion of the extrusion passage 25 is formed externally by a removable cap 26 which is bored at its upper end to form a continuation of the lower end of the bore of the end member 23 and at its lower end tapers inwardly to form a reduced extrusion orifice 27.

The internal wall of the annular extrusion chamber 25 is formed by an axially fixed tubular support member 30 and a control sleeve 31 which telescopes therein and is generally tapered at its lower end as at 32 to generally follow the converging tapered portion of the extrusion passage in the cap member 26 as will be described in greater detail later herein.

A blow tube 33 telescopes within control sleeve 31 and has a relatively close sliding fit in the lower end of the control sleeve, as is clearly shown in FIGS. 1 and 2. In FIGS. 1 and 2 the numeral 34 designates a relatively stationary sleeve having a head member 35 at its lower end which closely surrounds blow tube 33 and is tapered externally to form a scraper which prevents upward leakage or passage of plastic material along the external surface of blow tube 33.

In FIG. 1 the numerals 37 and 38 designate a pair of mold parts shown in open position in FIG. 1 but which are closable along a plane through the vertical axis of the extrusion head 20 to form an open-ended mold cavity having a main body portion 39, a neck portion 40 and a false finish portion 41. The so-called false finish portion comprises a further reduced neck of the molded article which is provided merely for purposes of manufacture and is removed in the course of finishing the outer end of the neck of the molded container.

FIG. 2 is similar to FIG. 1 excepting that it is taken at right angles thereto and shows a face view of one of the mold halves depicting the cavity portion therein and it will be noted that the wider dimension of the body of the finished bottle is as shown in FIG. 2.

FIGS. 3 and 4 show the extrusion orifice portion of the apparatus of FIGS. 1 and 2 on a greatly enlarged scale. FIGS. 3 and 4 are cross-sectional views taken the same as FIG. 1 but on an enlarged scale. In blow molding flat or non-circular bottles it is desired to extrude a tube of plastic material having non-uniform wall thickness around the circumference in order that more plastic is available for blowing the wider dimension of the body of the bottle.

To this end the beveled lower end 32 of control sleeve 31 is scalloped as shown diagrammatically in the transverse cross-sectional view, FIG. 12. In FIGS. 3 and 4 the greater transverse dimension of the beveled end 32 of control sleeve 31 is shown in solid lines and the lesser dimension (at right angles to FIGS. 3 and 4) is indicated by dot and dash lines designated A in FIGS. 3 and 4.

When blow tube 33 is in the relatively raised position shown in FIG. 3, the wall thickness of the extruded tube is mainly determined by the thickness of the space between the tapered portion of the extrusion orifice and the adjacent beveled end 32 of control sleeve 31. Accordingly, a thinner wall will be produced in the plane of FIGS. 3 and 4 than in a plane at right angles thereto.

The reduced end portion 44 of blow tube 33 is not necessarily employed to control or affect the wall thickness of the extrusion and is provided mainly to prevent mushrooming of the plastic emerging from between the beveled complementary faces of the orifice and the end of control sleeve 31.

After the body portion of the tube has been extruded blow tube 33 is moved downwardly to the position shown in FIG. 4 wherein its large diameter portion lies directly adjacent to the reduced extrusion orifice 27 and in this position of the parts the blow tube serves as an extrusion mandrel and the wall thickness of the extrusion is determined primarily by the width of the annular space between the periphery of blow tube 33 and extrusion orifice 27. Thus a uniform wall thickness portion is extruded to form the neck of the container.

FIG. 5 is a view similar to FIG. 3 but showing an arrangements wherein a control sleeve 130 has a beveled end 132 which is a surface of revolution and wherein the beveled portion of the orifice in cap member 126 is scalloped or formed non-circularly.

In FIG. 5 the numeral 150 designates the beveled surface of the orifice in cap member 126 in the plane shown in FIG. 1 for forming the narrow dimension of the body of the bottle, whereas the dot and dash line 151 indicates the relative location of the beveled surface of the orifice in a direction at right angles to FIG. 5 for forming the thicker portion of that part of the extrusion which forms the body of the bottle. In FIG. 5 the numeral 133 designates a blow tube the same as that shown in the embodiment of FIGS. 1 through 4.

Under certain conditions when the blow tube 33 is in the position of FIG. 4 for final extrusion of a cylindrical neck portion the "memory" effect of the plastic material may result in a non-round extrusion even though the final extrusion orifice is truly cylindrical. This "memory" effect is due to the scalloped passage which the plastic traverses before reaching the final orifice portion and may occur in either of the embodiments of FIGS. 3 and 4 or FIG. 5. To counteract this tendency it may on occasion be advisable or necessary to slightly scallop the orifice 27 oppositely to the scalloping of the beveled surfaces 32 or 150, as the case may be.

Furthermore, under special circumstances the final extrusion passage may be non-clyindrical in an opposie direction to that of the control sleeve or the beveled internal surface of the cap member. For instance, it may be desired to produce a bottle having an oval body and a neck which is oval but in an opposite direction, that is, at ninety degrees to the body of the bottle. In such case either the final orifice or the extrusion surface of the blow tube may be scalloped accordingly.

FIG. 12 illustrates the non-circularity of the beveled portion 32 of control sleeve 31, the narrower part extending vertically in FIG. 12 and the widerpart horizontally. The scalloping of this surface is exaggerated in FIG. 12 to illustrate the same since the actual dimensional differences in opposite directions are quite small. In FIG. 12 the dot and dash line B indicates a true circle, the sides of the beveled portion 32 being relieved in the manner illustrated in FIG. 12 by positioning the part eccentrically in a lathe and cutting from opposite sides of the bevel 32.

FIG. 13 is an illustration similar to FIG. 12 but illustrating the scalloping of the converging extrusion surface of the member 126 of FIG. 5. In FIG. 13 the line C illustrates a true circle, the tapered surface being given greater width vertically than horizontally, again by positioning the part eccentrically in a lathe and taking cuts from opposite sides of the beveled surface. Whereas the foregoing contemplates scalloping of either the extrusion orifice or the control sleeve, under some circumstances scallop formations may be formed on both the external and internal extrusion members.

As indicated in the preamble hereto, difficulty is ordinarily encountered in properly molding a false finish between the false finish portion of the cavity in the mold members and the periphery of blow tube 33. It is impractical to extrude a tube of precise wall thickness. If the wall is too thin there is not enough plastic to fully mold the false finish which leaves a partial void in the molded false finish. If the wall thickness of the extrusion is too thick it causes a harmful flash of fin which prevents the mold parts from closing properly and interferes with subsequent machine handling and other treatment of the bottles, including difficulty in trimming thereof.

The present apparatus solves this problem by deliberately molding fins of controlled maximum dimension along the false finish. The special cavity portions provided for molding the fins need not be filled with plastic material upon closure of the mold and thus they provide a space for variable amounts of excess plastic. Accordingly, the extrusion portion which forms the false finish may be made thicker than the actual precise thickness required to completely mold the false finish, such excess thickness being variable within certain limits to provide reasonable manufacturing tolerance.

The cavity portions thus provided for molding fins along the sides of the false finish of the bottle may be partly in each half of the mold but in the present instance involve only one-half of the mold, namely that half designated 37 in FIGS. 1 and 2. Referring to FIGS. 6 and 7, the semicircular false finish cavity 41 in mold half 37 has a marginal surface portion 175 which is set back slightly from the normal surface of the mold half, that is the plane of parting of the mold halves.

Figure 10:
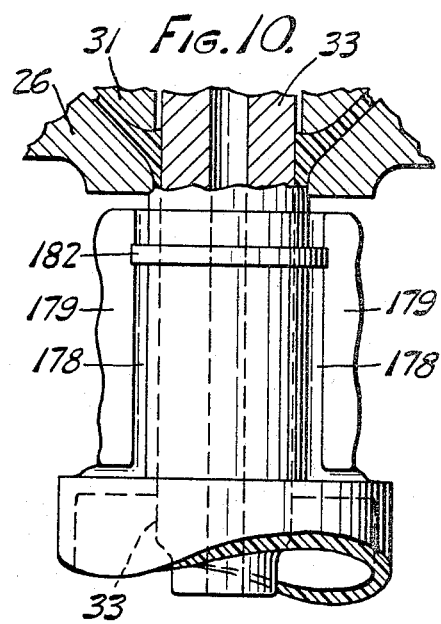
FIG. 10 is a view similar to FIGS. 8 and 9 showing the false finish as molded onto the blow tube after the mold halves have parted subsequent to completion of the blowing cycle.
Figure 9:
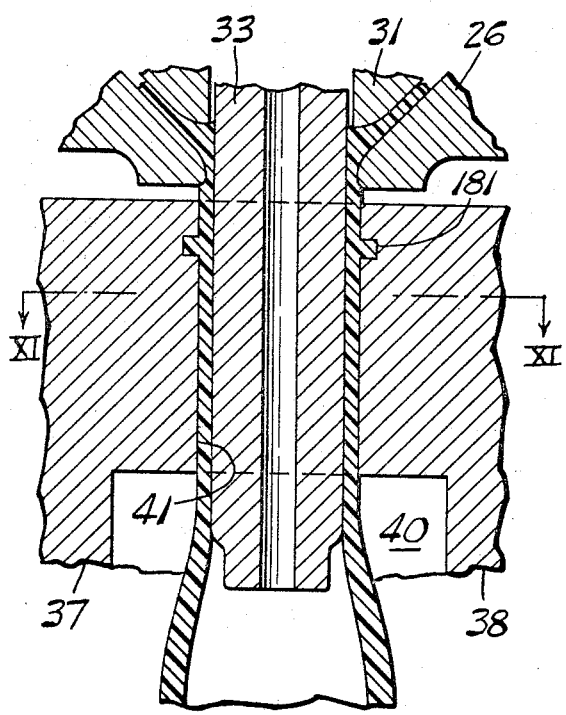
FIG. 9 is similar to FIG. 8 but with the mold closed onto the blow tube.
Figure 11:
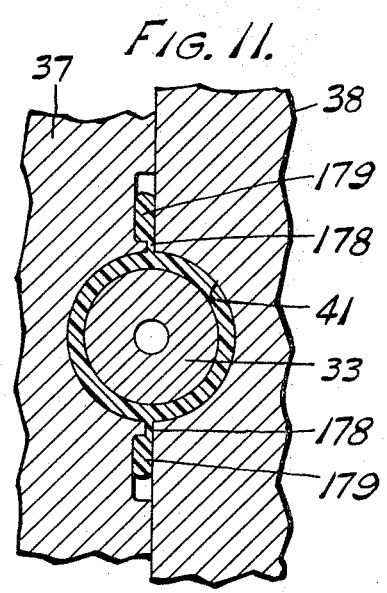
FIG. 11 is a cross-sectional view on the line XI—XI of FIG. 9.

Adjacent to this set-back surface 175 at each side of cavity 41 is a further set-back or recess portion 176 which is deeper than the set back 175. The cross-sectional configuration produced by the set-back surfaces 175 and 176 is shown in FIG. 11 and as a result of this recess arrangement excess plastic resulting when the mold halves close to mold the false finish portion produces fins having attenuated portions adjacent to the false finish itself, as clearly shown in FIGS. 10 and 11. In FIGS. 10 and 11 the thin portions of the fins are designated 178 and the thicker outer parts are designated 179.

Advantage of this form of fin resides in the fact that the thin part pinches the plastic to prevent escape of air while the thick part provides substantial space for excess plastic. While the form of fins shown herein is advantageous for the foregoing reason, other forms of deliberately molded fins may be employed for the same general purpose of insuring a fully molded false finish while also assuring that the mold parts will not be prevented from closing.

Groove formations 181 in the false finish mold cavity portions 41 form a bead on the false finish as indicated at 182 in FIG. 10. These bead formations are for use in subsequent handling of the articles and are not germane to the present invention.

I claim:
1. Apparatus for extruding plastic material in tubular form comprising an extrusion chamber terminating in a reduced extrusion orifice, said chamber having a wall portion converging to and merging with said orifice by means of a continuous streamlined surface, a first mandrel member disposed coaxially in said chamber and having a cylindrical outer peripheral portion, a second mandrel member comprising a hollow cylindrical member having its internal bore portion slidable on the outer cylindrical portion of the first mandrel member, the outer end surface of said second mandrel member being generally complementary to the continuous streamlined surface of said converging chamber wall portion and merging with the cylindrical portion of said first mandrel member, said surfaces defining a first annular extrusion passage of greater effective thickness at certain points about its circumference than at others and said second mandrel member being axially movable during extrusion, whereby a tubular extrusion of non-uniform wall thickness both circumferentially and in an axial direction may be formed, said first mandrel member having an end portion disposed in said reduced extrusion orifice to define a second annular extrusion passage which comprises a continuation of the first annular extrusion passage, the axial movement of said second mandrel member determining the relative effectiveness of said first annular extrusion passage and said second annular extrusion passage in defining the wall thickness and circumferential distribution of plastic material in said extrusion.

2. Apparatus according to claim 1 wherein said converging wall portion is a surface of revolution.

3. Apparatus according to claim 1 wherein the outer end surface of said second mandrel member is a surface of revolution.

4. Apparatus according to claim 1 wherein said reduced extrusion orifice is a surface of revolution.

5. Apparatus according to claim 1 wherein said first mandrel end portion is a surface of revolution.

6. Apparatus according to claim 1 wherein said first mandrel is axially movable relative to said reduced extrusion orifice.

7. Apparatus according to claim 1 including blow mold means in combination therewith and in which said first mandrel comprises a blow tube.

References Cited
UNITED STATES PATENTS
3,078,507   2/1962   Park _____ 18—5 X J. SPENCER OVERHOLSER, *Primary Examiner.*

W. L. McBAY, *Assistant Examiner.*